US005099979A

United States Patent [19]

Kehrel

[11] Patent Number: 5,099,979

[45] Date of Patent: Mar. 31, 1992

[54] PARTING DEVICE FOR SUBSTANTIALLY PARALLELIPIPEDIC BODIES OF DEEP-FROZEN FOODSTUFFS OR FEEDSTUFFS

[75] Inventor: Siegfried Kehrel, Haltern, Fed. Rep. of Germany

[73] Assignee: Heinz Nienstedt Maschinenfabrik GmbH, Haltern, Fed. Rep. of Germany

[21] Appl. No.: 639,807

[22] Filed: Jan. 10, 1991

[30] Foreign Application Priority Data

Jan. 16, 1990 [DE] Fed. Rep. of Germany ....... 4001050

[51] Int. Cl.[5] .......................... B65G 47/00; B26D 7/06

[52] U.S. Cl. .............................. 198/345.1; 198/836.3; 83/420; 83/449

[58] Field of Search ................. 83/420, 444, 446, 449, 83/415; 198/836.2, 836.6, 836.1, 345.1

[56] References Cited

U.S. PATENT DOCUMENTS 2,156,020 4/1939 Lathrop ............................ 198/836.3
3,527,336 9/1970 Johnston .......................... 198/836.3
3,880,035 4/1975 Divan .................................. 83/420
3,979,986 9/1976 Nienstedt ............................ 83/420

FOREIGN PATENT DOCUMENTS 2501089 7/1976 Fed. Rep. of Germany .

*Primary Examiner*—Douglas D. Watts
*Assistant Examiner*—C. Dexter
*Attorney, Agent, or Firm*—Marmorek, Guttman & Rubenstein

[57] ABSTRACT

The invention relates to a parting device for substantially parallelipipedic bodies of deep-frozen foodstuffs or feedstuffs. For the purpose of supplying the body (4) to be parted centred to parting elements, stop rails (2, 3) which can be urged towards the body (4) to be guided are disposed on both sides thereof. The stop rails (2, 3) are mounted via sliding pins (9, 11) in bearing blocks (13, 15) and so interconnected via a transmission comprising lever arms (26, 27), control shafts (20, 21) and links (28, 29) that they can be uniformly expanded apart against the force of springs, so that bodies of any width can be supplied centred to the parting elements.

3 Claims, 3 Drawing Sheets

PARTING DEVICE FOR SUBSTANTIALLY PARALLELIPIPEDIC BODIES OF DEEP-FROZEN FOODSTUFFS OR FEEDSTUFFS

The invention relates to a parting device for substantially parallelipipedic bodies of deep-frozen foodstuffs or feedstuffs, comprising a conveyor table having lateral stop rails which form a guide channel for the bodies which extends to one or more parting elements and are so interconnected via a transmission that they can be uniformly expanded apart against the force of a spring.

In a prior art parting device of the kind specified (German Patent Specification 24 44 139) U.S. Pat. No 3,979,986 each of the lateral stop rails is borne by a parallellogram guide. Mounted in the fixed pivoting axes of a pivotable lever arm of each parallelogram guide is a tooth segment which is rigidly connected to the pivotable lever arm. The tooth segments of opposite parallelogram guides engage with one another and form the transmission ensuring the uniform oppositely directed movement of the two stop rails. As a result, each parallelipipedic body of any width to be separated is supplied centred to the parting elements.

Such a parting device has proved useful in practice for more than a decade, but its only disadvantage is the considerable expense of constructing the parallelogram guides and the transmission connecting the parallelogram guides.

It is an object of the invention to provide a parting device of the kind specified which ensures that the parallelipipedic bodies to be supplied to the parting elements are centred by a less expensive construction than in the prior art parting device.

This problem is solved in a parting device of the kind specified by the features that each lateral stop rail is mounted in bearing blocks for displacement transversely of the guide channel, the sliding pins of each stop rail are connected via connecting members to a control shaft extending along each stop rail, and the control shafts of the two stop rails are interconnected for joint oppositely directed movement.

The invention substitutes a very simple linear parallel guide for the expensive prior art parallelogram guide. The connection of the sliding pins to the control shaft ensures that each stop rail is displaced precisely parallel and without tilting. According to one feature of the invention the connecting members are levers disposed rigidly on the control shaft. The movement of the two control shafts to opposite hands can be achieved in a very simple manner by the feature that the levers of one control shaft are connected via a link to one arm of two-armed lever, the levers of the other control shaft being connected via a link to the other arm of the two-armed lever.

The invention will now be explained in greater detail with reference to drawings which diagrammatically illustrate a parting device and wherein.

Figure 1:
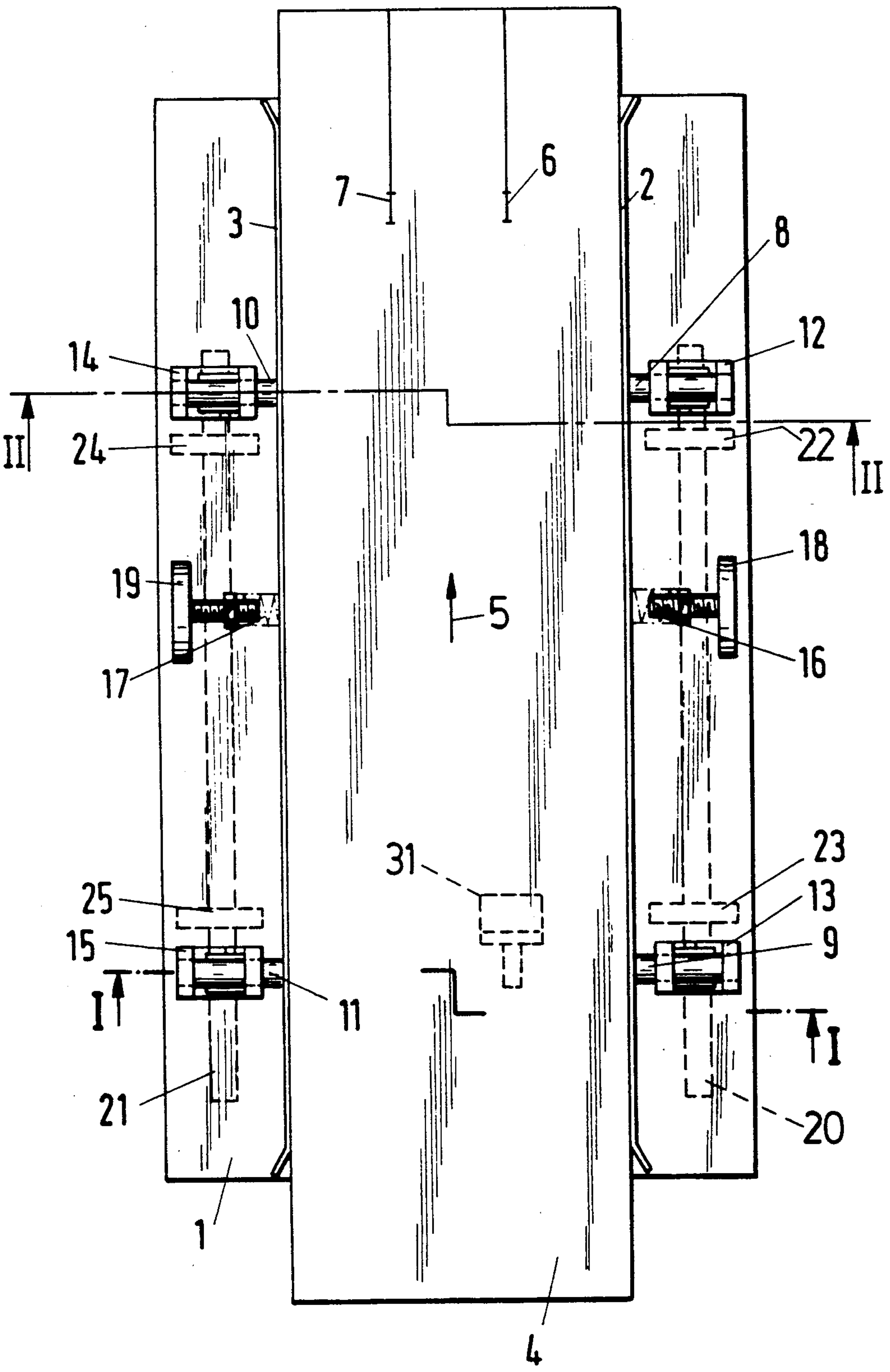
FIG. 1 is a plan view of a parting device.
Figure 2:
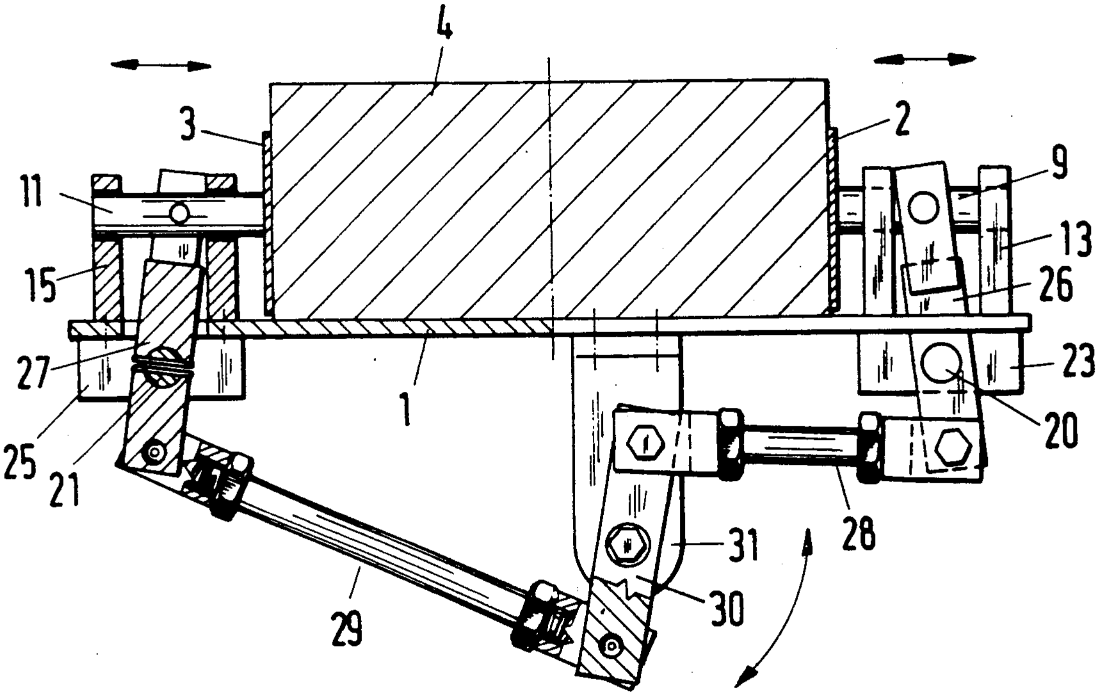
FIG. 2 shows the parting device illustrated in FIG. 1, in cross-section along the line I—I in FIG. 1.

A parting device has a conveyor table 1 on which two stop rails 2, 3 are mounted at a variable distance. The two stop rails 2, 3 form between themselves a guide channel for a substantially parallelipipedic body 4, more particularly of deep-frozen foodstuffs. As it is being conveyed in the direction indicated by arrows 5, the body 4 is longitudinally parted by parting elements 6, 7, for example, band saws, disposed in the conveying path between the stop rails 2, 3. The lateral stop rails 2, 3 ensure in a manner disclosed hereinafter that each body 4 of any width is supplied centred to the parting elements 6, 7.

Each stop rail 2, 3 is borne by two rear side sliding pins 8–11 which are displaceably mounted in blocks 12–15 positioned on the conveyor table 1. The rear side of the stop rails 2, 3 is acted upon by compression springs 16, 17 which bear against abutments 18, 19.

Figure 3:
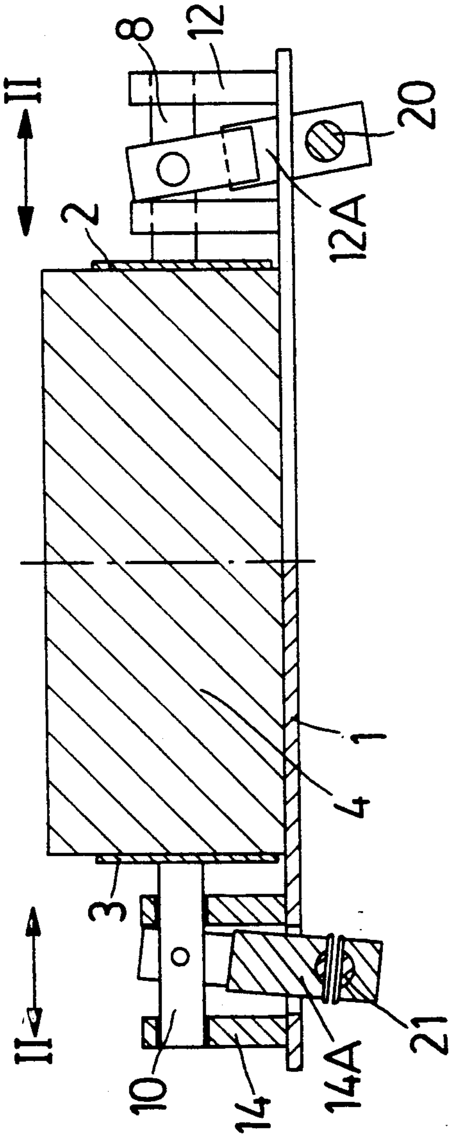
FIG. 3 shows a cross-section of the parting device illustrated in FIG. 1 along the line II—II.

A control shaft 20, 21 pivotably mounted in blocks 22–25 extends below the conveyor table 1 parallel with each stop rail 2, 3. Disposed on each control shaft 20, 21 in the zone of the bearing blocks 12, 14 are one-armed levers 12A, 14A (see FIG. 3) and in the zone of the blocks 13, 15 are two-armed levers 26, 27 which are connected to the associated sliding pins 8–11. The one armed levers 12A, 14A serve to translate the rotation of the control shafts 20, 21 into a linear motion directed transversely to the direction arrow 5. The two-armed levers 26, 27 are also connected via links 28, 29 to a two-armed lever 30 mounted in a bearing block 31 on the underside of the conveyor table 1.

The compression springs 16, 17 exert on the stop rails 2, 3 a force which tends to move the two stop rails 2, 3 towards one another. However, due to their driving connection, the two stop rails 2, 3 can perform only a common and uniform movement, so that each body 4 is centred.

The length of the stop rails 2, 3 is determined depending on the length of the bodies to be parted. If the bodies regularly differ in width over their length, advantageously the stop rails 2, 3 are constructed shorter that the length of the bodies, since in that case, a more individual adaptation to the bodies and therefore improved centring are achieved.

I claim:

1. A parting device for parting substantially parallipipedic bodies, comprising a conveyor table having first and second lateral stop rails which form a guide channel for said bodies, said lateral stop rails being interconnected via a transmission such that they can be uniformly expanded apart against the force of a spring associated with each stop rail, each lateral stop rail being mounted on sliding pins in bearing blocks for displacement transversely of said guide channel, the sliding pins being connected via first and second connecting members to first and secon control shafts extending along each of said stop rails, said first and second control shafts being interconnected for joint movement in opposite directions.

2. The parting device according to claim 1 wherein the first and second connecting members are levers disposed rigidly on the control shafts.

3. The parting device according to claim 2 further comprising a two-armed lever connected to said levers via links, wherein said first control shaft is connected to one arm of said two-armed lever and said second control shaft is connected to a second arm of said two-armed lever.

* * * * *